Jan. 3, 1928.  R. A. WARNER  1,655,252
FREQUENCY CHANGER
Filed Dec. 10, 1926

Inventor:
Russell A. Warner,
by
His Attorney.

Patented Jan. 3, 1928.

1,655,252

UNITED STATES PATENT OFFICE.

RUSSELL A. WARNER, OF SCHENECTADY, NEW YORK, ASSIGNOR TO GENERAL ELECTRIC COMPANY, A CORPORATION OF NEW YORK.

FREQUENCY CHANGER.

Application filed December 10, 1926. Serial No. 153,956.

My invention relates to frequency changers and is particularly adapted for use between two independent alternating current systems of the same or different frequencies.

When tying two alternating current systems together by means of a frequency changer set, it is desirable that the frequency changer may be readily synchronized at the set regardless of the frequency and phase relation between the systems. It is also desirable that the load transferred between the systems be adjustable in either direction. In some cases it is desirable that the means employed for connecting the two systems shall provide a voltage tie as well as a frequency tie between such systems and shall be capable of providing power factor correction to one or both systems. The frequency changer of my invention satisfies all of these requirements. In carrying my invention into effect, I use a synchronous rotary converter and a wound secondary induction machine mechanically connected together, preferably by a direct connection. These two machines are respectively connected to the two systems in the usual way. Then the secondary winding of the induction machine is excited either directly or indirectly from the commutator end of the synchronous converter through suitable derectifying apparatus which may comprise movable brushes on the commutator end of the converter which brushes are rotated at the speed necessary to obtain an alternating current from the commutator end of the synchronous converter having a frequency equal to that of the secondary frequency of the induction machine when the set is running at the synchronous speed of the converter.

The features of my invention which are believed to be novel and patentable will be pointed out in the claims appended hereto. For a better understanding of my invention reference is made in the following description to the accompanying drawing in which Fig. 1 shows an embodiment of the invention where the secondary of the induction machine is excited directly from the commutator end of the synchronous converter and Fig. 2 shows the excitation carried through a separate exciting machine.

Figure 1:
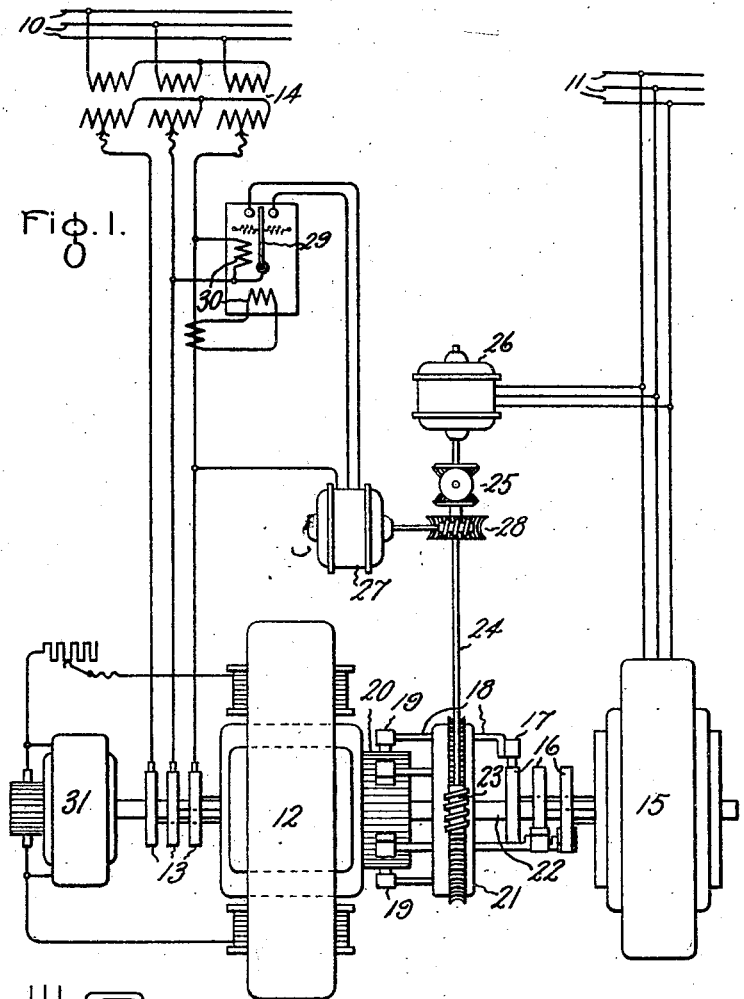
Figure 2:
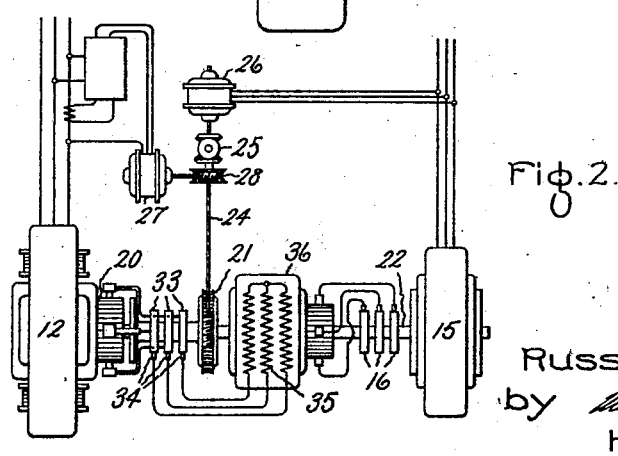

Referring to Fig. 1 of the drawing 10 and 11 represent two alternating current distribution systems which will be assumed to be 25 and 60 cycle systems respectively. The specific frequencies mentioned and likewise the specific pole numbers and speeds hereafter mentioned are taken for the purpose of illustration to clearly explain the invention and not for the purpose of limiting the invention in these respects. 12 represents a 4 pole synchronous converter having its A. C. end connected through slip rings 13 and an adjustable transformer 14 to the 25 cycle system. The normal speed of this machine will therefore be 750 R. P. M. and it will fix the speed of the set. 15 represents a 12 pole induction machine having its stator connected to the 60 cycle system. The rotor winding of this machine is connected through slip rings 16, brushes 17, connectors 18 and brushes 19 to the commutator 20 of the synchronous converter. The brushes 17, connectors 18 and brushes 19 are carried by a supporting yoke 21 which is rotatively mounted and may have a bearing on main shaft 22 of the set. The induction machine is represented as being 3 phase and since the synchronous converter is a 4 pole machine there will be six evenly spaced brushes 19 on its commutator, each diametrically opposite pair being connected together and with one of the rings 16. Thus, the upper and lower pair of brushes 19 are connected together by a suitable connector preferably carried within the yoke 21 and with the left hand ring 19 by the top connector 18. The other pairs of brushes on commutator 20 are similarly connected with the other two rings 16 thus establishing a polyphase connection between the two machines. The synchronous speed of the 12 pole induction machine 15 is 600 R. P. M., but it is rotated at 750 R. P. M. by the synchronous converter and it will therefore have a normal 15 cycle current in its secondary. If the brushes 19 remained stationary they would have direct current voltages impressed upon them from the synchronous converter. These brushes are therefore rotated at 450 R. P. M. through the brush yoke 21, worm gear 23, shaft 24 and differential 25 by means of a synchronous motor 26 supplied from the 60 cycle system so that a 15 cycle voltage is impressed upon the brushes 19 from the direct current end of the synchronous converter. The motor 26 might be supplied from the 25 cycle system.

Preferably the direction of rotation of the brushes is the same as that of shaft 22 so that practically all of the energy for rotating the brushes is supplied through the sectional drag between the brushes and their contacting surfaces. The motor 26 therefore acts chiefly as a control motor and may be a small high speed synchronous motor.

The motor 26 drives the upper side of the differential 25 and shaft 24 is connected with the central member of the differential. The lower side of the differential is normally stationary but may be rotated slowly in either direction by a pilot motor 27 through a worm gear 28 to adjust the phase relation between the two machines 12 and 15 and take care of any frequency variation between the two systems. The motor 27 is connected through a reversing switch 29 to any suitable source which in this case happens to be the supply leads to the synchronous converter. The reversing switch 29 may be controlled by hand during synchronizing and thereafter controlled automatically by a wattmeter element indicated at 30 to keep the load transfer through the set within desirable limits.

The direct current field of the synchronous converter is represented as being supplied by a separate exciter 31. This field could be supplied by stationary brushes on the commutator 20 as is usual, but on account of the high voltage which it will be desirable to have on this commutator it will generally be preferable to provide the separate exciter 31 for this purpose.

The set may be started in any suitable manner and if desirable provision may be made for lifting the brushes 17 during the starting period. Motor 26 will then be started. Preferably the converter will be connected to the line first and its direct current field applied. Then motor 27 will be manually controlled to adjust the phase relation between machines 12 and 15 so that machine 15 may be connected to its line without shock thus tying the systems together. The machines 12 and 15 will of course be designed to give about the same voltage at their interconnections when operating at normal speed. Preferably machine 12 will be designed so that by overexciting its field it will supply all the excitation for the induction machine 15, and, in addition, supply leading current to system 10 for power factor correction. Adjustment of voltage relation between the two systems may be had by the adjustable transformer 14 since the voltage at the commutator 20 bears a definite relation to the voltage at the slip rings 13 and the induction machine 15 acts in part as a transformer to complete the voltage tie. In some cases it may be desirable to have two rotor windings on the rotor of 12, one connected to the commutator 20 and the other connected to the slip rings 13 said windings being laid in the same slots and thus inductively coupled.

When the frequency converter is in operation the direction and magnitude of power transfer may be adjusted by adjusting the phase angular relation between machines 12 and 15 by causing the brushes 19 to momentarily depart from the speed fixed by synchronous motor 26. Machine 15 acts in part like a synchronous machine with A. C. excitation so that if we advance the phase of the excitation supplied to it from machine 12, while it is being held at a fixed speed by the synchronous converter, it starts to act as a generator and if we retard the phase it acts as a motor. This phase adjustment for lead control is provided by the pilot motor 27 acting through the normally stationary part of the differential 25. We may adjust the setting of the control switch 29 to automatically hold the power transfer within certain limits in either direction or we may adjust it so as to prevent overload in both directions since as is well known both machines 12 and 15 are capable of acting either as motors or generators. Variation in the frequency relation between the two systems will be taken care of automatically by this arrangement.

Thus we have a frequency changer tie between the two systems which is easily synchronized at the set by manual control of the switch 29, and by means of which the direction and magnitude of power transfer between the two systems by motor generator action may be regulated, as desired, either manually or auomatically. Power factor regulation is provided by adjustment of the field strength of the synchronous converter and a voltage tie is provided between the two systems by reason of the transformer action of machine 15. This voltage tie is adjustable by means of the adjustable transformer 14.

The power factor control, motor generator load transfer control, and voltage tie control are independently adjustable so that the arrangement provides a connection between the two systems of desirable flexibility which is capable of adjustment for a wide variety of operating conditions. This flexibility is provided by a relatively small amount of auxiliary apparatus as compared to previous systems of less flexibility.

Another combination for connection between 25 and 60 cycle systems would be a 4 pole 60 cycle synchronous converter operating at 1800 R. P. M. direct connected to a 4 pole 25 cycle induction machine, having a 35 cycle secondary frequency with the brush yoke rotating at 1050 R. P. M. For connection between 25 and 40 cycle systems we could use a 4 pole 25 cycle synchronous converter operating at 750 R. P. M. and a 10 pole 40 cycle induction machine having a secondary frequency of 22½ cycles requiring a brush yoke rotation of 741 R. P. M. For connection between systems of the same frequency the two machines of the set could have the same pole number. The brush yoke would then be normally stationary and direct current would flow in the induction machine secondary. A small pilot motor corresponding to motor 27 of Fig. 1 for adjusting the position of the brushes would be sufficient for such a combination.

In those combinations where the secondary voltage and frequency of the induction machine are low, requiring a large secondary current, it will be desirable to excite the secondary of the induction machine from the synchronous converter through an auxilliary exciting machine connected between the commutator of the synchronous converter and the secondary of the induction machine in the manner represented in Fig. 2 to avoid commutation difficulties.

In Fig. 2 the rotatable brush yoke 21 has slip rings 33 mounted directly upon a sleeve integral with the yoke. These rings are connected to the commutator 20 of the converter 12 through suitable polyphase connectors and brushes. Stationary brushes 34 bear upon rings 33 so as to take off an exciting current of the secondary frequency of the induction machine 15 for the purpose of exciting the stationary stator field winding 35 of the polyphase commutator exciting machine 36. The rotor of this machine may be mounted on the shaft of the set as represented. Machine 36 is in general similar to the well known Scherbius exciting machine commonly used for supplying the regulating current for the secondary windings of induction motors and its commutator is connected through slip rings 16 to the secondary winding of the induction machine 15. It will have the same pole number as the induction machine. With this arrangement we may take a small high voltage exciting current of the proper frequency from the commutator of the synchronous converter by means of the rotating brush yoke 21 and obtain a large low voltage current from the commutator of machine 36 of the same frequency for supplying the secondary of the induction machine. The machine 36 having stationary brushes may be designed with all the facilities, such as interpoles, for good commutation and its chief function is to avoid commutation difficulties at the commutator of the synchronous converter where that is necessary. While it is feasible to take a relatively small high voltage current from the commutator of 12 by means of rotating brushes, it would not be practicable to draw a large current therefrom in this way because interpoles on the synchronous converter would be no aid to this type of commutation. The commutation difficulties of the converter may be reduced by employing a distributed direct current field winding on the stator, using the proper type of commutator and brushes and keeping the commutated current as low as possible.

In general the extra exciting machine 36 will be desirable in frequency changer sets of large capacity when the induction machine operates near its synchronous speed so as to require a large low voltage current in its secondary.

In accordance with the provisions of the patent statutes, I have prescribed the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. A frequency changer set comprising a synchronous converter and an induction machine mechanically coupled together, and means for exciting the secondary winding of the induction machine with alternating current of slip frequency from the synchronous converter when the latter is operating at synchronous speed.

2. A frequency changer set comprising a synchronous converter and an induction machine mechanically connected together, and means for exciting the secondary winding of said induction machine from the direct current end of said synchronous converter including derectifying apparatus arranged to convert direct current into alternating current of the slip frequency of said induction machine when the set is operating at the synchronous speed of the converter.

3. A frequency changer comprising a synchronous converter and an induction machine mechanically connected together, and means for exciting the secondary winding of the induction machine from the direct current end of said synchronous converter at the slip frequency of said induction machine when the synchronous converter is operating at synchronous speed, said means including rotatively mounted brushes on the commutator of said converter and means for rotating said brushes at the speed necessary to convert the direct current voltage of said converter to an alternating current voltage of said slip frequency.

4. A frequency changer set comprising a synchronous converter mechanically coupled to an induction machine, means for exciting the secondary of said induction machine from the direct current end of said synchronous converter, said means including rotatively mounted brushes on the commutator end of said synchronous converter adapted to be rotated in the same direction as that of the converter commutator at the speed necessary to obtain an alternating voltage of the slip frequency of said induction machine when the set is running at the synchronous speed of said converter, and means for controlling the speed of rotation of said brushes.

5. A frequency changer set comprising a synchronous converter and an induction machine mechanically connected together, means for exciting the secondary winding of said induction machine from the direct current end of said converter including derectifying apparatus arranged to convert direct current into alternating current of the slip frequency of said induction machine when the set is operating at the synchronous speed of the converter, and means for adjusting the phase angle of such excitation.

6. A frequency converter set comprising a synchronous converter mechanically connected to an induction machine, means for exciting the secondary of said induction machine from the direct current end of said converter incuding derectifying apparatus arranged to convert direct current into alternating current of the slip frequency of said induction machine when the set is operating at the synchronous speed of the conerverter, and automatic means responsive to the load on said set for adjusting the phase angle of such excitation.

7. A frequency changer set comprising a synchronous converter mechanically coupled to an induction machine, means for exciting the secondary of said induction machine from the direct current end of said converter comprising derectifying apparatus arranged to convert direct current obtained from said converter into alternating current of the slip frequency of said induction machine when the set is operating at the synchronous speed of said converter and an alternating current regulating machine concatenated with the secondary of said induction machine and excited from the alternating current side of said derectifying apparatus.

8. In combination with two alternating current distribution systems, a frequency changer set connected between said systems comprising a synchronous converter connected to one system and an induction machine connected to the other system, the rotary part of said machines being connected together, automatic means for exciting the secondary of said induction machine at its slip frequency when the set is operating at the synchronous speed of said converter and means for adjusting the phase angle of such excitation for the purpose of controlling the direction and magnitude of the load transferred through said set.

In witness whereof, I have hereunto set my hand this 9th day of December, 1926.

RUSSELL A. WARNER.